(12) United States Patent
Jian et al.

(10) Patent No.: US 9,985,513 B2
(45) Date of Patent: May 29, 2018

(54) MAGNETIC TRANSMISSION APPARATUS

(71) Applicant: SOUTH UNIVERSITY OF SCIENCE AND TECHNOLOGY OF CHINA, Shenzhen (CN)

(72) Inventors: Linni Jian, Shenzhen (CN); Yujun Shi, Shenzhen (CN); Jin Wei, Shenzhen (CN)

(73) Assignee: SOUTH UNIVERSITY OF SCIENCE AND TECHNOLOGY OF CHINA, Shenzhen, Guangdong (CN)

( * ) Notice: Subject to any disclaimer, the term of this patent is extended or adjusted under 35 U.S.C. 154(b) by 219 days.

(21) Appl. No.: 15/032,281

(22) PCT Filed: Nov. 19, 2014

(86) PCT No.: PCT/CN2014/091670
§ 371 (c)(1),
(2) Date: Apr. 26, 2016

(87) PCT Pub. No.: WO2016/078039
PCT Pub. Date: May 26, 2016

(65) Prior Publication Data
US 2016/0344275 A1 Nov. 24, 2016

(51) Int. Cl.
H02K 49/10 (2006.01)

(52) U.S. Cl.
CPC .......... *H02K 49/102* (2013.01); *H02K 49/10* (2013.01)

(58) Field of Classification Search
CPC ........................................ H02K 49/10–49/108
(Continued)

(56) References Cited

U.S. PATENT DOCUMENTS 2,741,714 A * 4/1956 Regelman ............ H02K 49/108
310/103

FOREIGN PATENT DOCUMENTS

| CN | 101834513 | 9/2010 |
|---|---|---|
| CN | 101931309 | 12/2010 |

(Continued)

*Primary Examiner* — Thomas Truong
(74) *Attorney, Agent, or Firm* — Hamre, Schumann, Mueller & Larson, P.C.

(57) ABSTRACT

A magnetic transmission apparatus is disclosed, wherein the magnetic transmission apparatus includes a still part (4), a first rotating shaft (81), a second rotating shaft (82), a first rotating part (1), a second rotating part (2), and a third rotating part (3); the first rotating part (1) is rigidly connected with the first rotating shaft (81); the second rotating part (2), the third rotating part (3) are fixed on the second rotating shaft (82); the first rotating part (1), the second rotating part (2), and the third rotating part (3) are successively distributed along an axial direction; the still part (4) includes a magnetic regulation seat (41) and a magnetic regulation ring (42); the second rotating part (2) is located inside the magnetic regulation ring (42); the first rotating part (1) includes a first iron core (11), a first permanent magnet (12), and a first support part (811); the second rotating part (2) includes a second iron core (21), and a second permanent magnet (22); the third rotating part (3) includes a third iron core (31), a third permanent magnet (32), and a second support part (821); the first iron core (11), the first permanent magnet (12), the magnetic regulation ring (42), the third permanent magnet (32) and the third iron core (31) are successively distributed along the axial direction. The first permanent magnet (12) and the third permanent magnet (32) are magnetized alternately and axially; the second permanent magnet (22) is magnetized alternately radially. The magnetic transmission apparatus has an axially (Continued)

and radially mixed magnetic circuit and can take full advantage of the magnetic modulation space and improve the torque density.

10 Claims, 9 Drawing Sheets

(58) Field of Classification Search
USPC .................. 310/103, 104, 114, 266, 268
See application file for complete search history.

(56) References Cited

FOREIGN PATENT DOCUMENTS

| | | | |
|---|---|---|---|
| CN | 203788125 | 8/2014 | |
| CN | 104506015 | 4/2015 | |
| EP | 0034992 | 9/1981 | |
| WO | 02/075906 | 9/2002 | |
| WO | WO 2010148990 A1 * | 12/2010 | ........... H02K 49/108 |

* cited by examiner

MAGNETIC TRANSMISSION APPARATUS

FIELD OF THE INVENTION

The present application relates to the field of magnetism-energy transformation technology and power transmission apparatus manufacturing technology, especially to a magnetic transmission apparatus.

BACKGROUND OF THE INVENTION

As known to all, mechanical gear apparatuses have been applied widely in the industry field. It's not hard to find out that mechanical gears are composed of a plurality of individual moving elements, and the power transmission between the a plurality of moving elements is achieved by the engagement of teeth arranged on peripheries of the moving elements. Therefore, the contact between the moving elements of the mechanical gears will definitely bring a plurality of troubles such as friction loss, vibration, noise, lubrication requirement and periodical maintenance requirement. Mechanical gears are severely limited in circumstances concerning fluid-flow control, such as in an artificial blood pump or a poison gas pipe pump, because the mechanical gears cannot realize complete isolation between the output end and the input end. Thus, there may often be the hidden danger of fluid leakage, and the failure of sealing measure will bring severe result. In industry application, there exist many occasions which require speed changes, and giant mechanical gear boxes are generally required to meet the requirements. A giant gear box will unavoidably increase the volume and weight of a system, and improve the complexity of the system. Furthermore, the mechanical gears are engaged with each other rigidly with teeth, once the torque is beyond the affordability force, security accidents are likely to happen.

Magnetic transmission apparatus is also known as magnetic gear, which is a new transmission technology. The magnetic transmission apparatus utilizes the magnetic fields of permanent magnets to transmit force or torque, since there is no contact action between the magnet fields of the permanent magnets, contactless transmission of force or torque can be achieved. Compared with mechanical gear, the advantages of magnetic transmission apparatus are: (1) the output end and input end being completely isolated; (2) better sealing compared with mechanical gear; (3) over protection capacity; (4) being able to help soft start the engine; (5) no noise; (6) no periodical maintenance. The magnetic gear can remedy the deficiency of the mechanical gear, and has been applied in a plurality of transmission circumstances.

The current magnetic gears can be classified into direct coupled type magnetic gears and magnetic field modulated type magnetic gears. The direct coupled type magnetic gears generally transmit force or torque by imitating the mechanical gears. The magnetic field of the permanent magnets of the direct couple type magnetic gears possesses a pretty low degree of coupling; therefore, the torque density thereof is lower than that of the mechanical gear. Magnetic field modulated type magnetic gears generally refer to coaxial magnetic gears which utilize iron cores to modulate the magnetic field formed by the permanent magnets, thereby forming plenty of magnetic field harmonics, and achieving speed changes and transmissions of force or torque through the interaction of the magnetic harmonics. The magnetic gears take full advantage of the magnetic field excited by the permanent magnets, and improve the torque density of the magnetic gear greatly. With the development of the material of permanent magnets, torque density of the magnetic gears has improved to the extent which is comparable with that of the mechanical gears.

Torque density has always been an important performance indicator to measure the performance of magnetic gears. In order to improve the torque density of the magnetic gears, many experts have been researching the topological structures of magnetic gears deeply. Currently, the magnetic gears are mainly classified into two categories: radial magnetic gear and axial magnetic gear. The radial magnetic gear means a magnetic gear of which the air-gap magnetic field distributes radially, and the topological structure of the radial magnetic gear is distributed with an inner rotor, a magnetic regulation ring and an outer ring from the inside out. The magnetic regulation ring located between the inner rotor and the outer rotor brings great trouble for designing, manufacturing, fixing and supporting the structure of the magnetic regulation ring, since each of the magnetic regulation iron cores of the magnetic regulation ring of the magnetic gear cannot be short-connected together in order to improve the performance of the magnetic regulation performance of the iron core. In order to decrease eddy-current loss, two end caps respectively on the left and right of the magnetic regulation ring are added with insulating mats, and even fixture bolts are considered to be added with insulating devices. Furthermore, since the iron cores of the magnetic regulation ring are independent, and the magnetic fields produced by the permanent magnets of the inner rotor and outer rotor work on the still magnetic regulation ring, therefore, the issues such as the rigidity of the mounted iron core structure and avoiding the position shift of the iron core should be considered. Technical solutions of the prior art remedy the above mentioned issues, however, the technical solutions improve the complexity of the structure, some of them even sacrifice the performance of the magnetic gear. Another kind of axial magnetic gear means magnetic gear of which the air-gap magnetic field distributes axially. The magnetic gear is axially distributed with a slow disk composed of a slow disk iron core and a slow disk permanent magnet, a stator composed of magnetic regulation iron blocks, and a fast disk composed of a fast disk permanent magnet and a fast disk iron core from left to right. However, the above-mentioned radial magnetic gear and axial magnetic gear possess a sole magnetic circuit, which is either radial or axial, and the design and the manufacturing of the magnetic regulation mechanism of the radial magnetic gear are very troublesome.

SUMMARY OF THE INVENTION

The invention is intended to provide a magnetic transmission apparatus which possesses an axially and radially mixed magnetic circuit, and is capable of taking full advantage of the magnetic modulation space and improving the torque density.

In order to solve the above issues, the invention provides a magnetic transmission apparatus which includes a still part, a first rotating shaft, a second rotating shaft, a first rotating part, a second rotating part, and a third rotating part.

The first rotating shaft, the second rotating shaft, the first rotating part, the second rotating part, and the third rotating part are all rotatably arranged relative to the still part; the first rotating shaft and the second rotating shaft are arranged coaxially, and both distributed along an axial direction; the first rotating part is rigidly connected with the first rotating shaft as a whole; the second rotating part, the third rotating part and the second rotating shaft are fixedly connected together as a whole; the first rotating part, the second rotating part, and the third rotating part are successively distributed along the axial direction.

The first rotating part includes a first iron core, a first permanent magnet and a first support part; both the first iron core and the first permanent magnet are ring shaped; both the first iron core and the first permanent magnet are mounted on the first support part; the first support part and the first rotating shaft are rigidly connected.

The second rotating part includes a second iron core and a second permanent magnet; the second rotating part is fixed on the second rotating shaft; both the second iron core and the second permanent magnet are ring shaped; the second permanent magnet is mounted on the second iron core concentrically and coaxially.

The third rotating part includes a third iron core, a third permanent magnet and a second support part; the second support part is fixed on the second rotating shaft; both the third iron core and the third permanent magnet are ring shaped and mounted on the second support part.

The still part mainly includes a magnetic regulation seat and a magnetic regulation ring; the magnetic regulation seat is made of non-magnetic non-electrical conductive material; the magnetic regulation ring is ring shaped and fixed on the magnetic regulation seat; the second rotating part is located inside the magnetic regulation ring; the second rotating part and the magnetic regulation ring are homocentric and coaxial; the first iron core, the first permanent magnet, the magnetic regulation ring, the third permanent magnet and the third iron core are coaxially arranged, and successively distributed along the axial direction; the first permanent magnet and the third permanent magnet are magnetized axially; the second permanent magnet is magnetized radially.

Wherein, the first support part, the first rotating shaft, and the second rotating shaft are all made of non-magnetic conductive material; the second support part is made of non-magnetic non-electrical conductive material.

Wherein, the first permanent magnet includes $2N_1$ first permanent magnetic blocks; the $2N_1$ first permanent magnetic blocks are distributed into a ring shape along a circumference; the $2N_1$ first permanent magnetic blocks are magnetized axially alternately so as to form $N_1$ pairs of permanent magnetic pole; the third permanent magnet includes $2N_2$ third permanent magnetic blocks; the $2N_2$ third permanent magnetic blocks are distributed into a ring shape along the circumference, of which the magnetic pole is magnetized alternately so as to form $N_2$ pairs of permanent magnetic pole axially; the second permanent magnet includes $2N_2$ second permanent magnetic blocks; the $2N_2$ second permanent magnetic blocks are distributed into a ring shape along the circumference; the $2N_2$ second permanent magnetic blocks are magnetized axially and alternately so as to form $N_2$ pairs of permanent magnetic pole; the magnetic regulation ring includes $N_3$ magnetic regulation blocks; the $N_3$ magnetic regulation blocks are evenly distributed at regular intervals along the circumference; $N_3=N_1+N_2$, wherein $N_1$ and $N_2$ are positive integrals, and $N_1 \neq N_2$.

Wherein, the first rotating part rotates at the speed of $\omega_1$; the second rotating part and the third rotating part rotate at the same speed, $\omega_2$, with the second rotating shaft, wherein $\omega_1=-N_1/N_2\omega_2$, and the negative sign signifies that the rotating directions are opposite.

Wherein, the third permanent magnetic blocks are one-to-one correspondent with the second permanent magnetic blocks. The one-to-one correspondent third permanent magnetic blocks and second permanent magnetic blocks are assembled into a stepladder shape, and the adjacent magnetic pole therebetween is identical.

Wherein, the first permanent magnet and the third permanent magnet have identical inner diameters and identical outer diameters; the magnetic regulation ring is located in the very middle position between the first permanent magnet and the third permanent magnet, and has the same inner diameter as the first permanent magnet.

Wherein, the still part further includes a first housing with a tube shape and a second housing with a tube shape; a plurality of magnetic regulation grooves are provided on the inner side of the magnetic regulation seat; the magnetic regulation grooves are evenly distributed along the circumference; the magnetic regulation blocks of the magnetic regulation ring are fixed on the magnetic regulation grooves; the first housing and the second housing are coaxial with the magnetic regulation seat; the magnetic regulation seat is arranged between the first housing and the second housing; the first rotating part is arranged inside the first housing, and the second rotating part is arranged inside the second housing.

Wherein, the first housing, the second housing, and the magnetic regulation seat are formed integrally; or the first housing, the second housing, and the magnetic regulation seat are of independent structures, and fixedly connected by a bolt.

Wherein, the magnetic regulation blocks are compressedly moulded using soft magnetic powder in the magnetic regulation grooves; or The magnetic regulation blocks are laminated along the circumference with silicon steel sheet.

Wherein, a plurality of through-holes are arranged on the magnetic regulation seat which are one-to-one correspondent with the magnetic regulation grooves; the through-holes are arranged along the axial direction, and located between the magnetic regulation grooves and the outer side of the magnetic regulation seat; the still part further includes a plurality of ribands which are one-to-one correspondent with the through-holes; the ribands pass through the through-holes and the inner surface of the magnetic regulation seat to form a ring shape, and wrap the magnetic regulation blocks.

The magnetic transmission apparatus of the present application possesses a axially and radially mixed magnetic circuit because the first permanent magnet and the third permanent magnet are magnetized axially and the second permanent magnet is magnetized radially; the magnetic field produced by the first permanent magnet, the second permanent magnet and the third permanent magnet is modulated by the magnetic regulation ring; more magnetic field harmonic in the axial air gap and radial air gap will contribute to the transmission of the torque, thereby taking full advantage of the finite geometric space; the orthogonality and the specific position relation between the second permanent magnet and the third permanent magnet force the magnetic field lines produced by the second permanent magnet and the third permanent magnet to one side of the first rotating part, thereby improving the degree of coupling of the magnetic field, and the torque density of the magnetic transmission apparatus.

BRIEF DESCRIPTION OF THE DRAWINGS

In order to make the technical solutions of the invention clearer, the drawings applied in the embodiments are briefly introduced. Obviously, the described drawings are just some of the embodiments of the invention, one of ordinary skilled in the art can also devise other drawings on the basis of the following drawings without paying extra creative works.

DETAILED DESCRIPTION OF THE PREFERRED EMBODIMENT

The technical solutions of the embodiments in the invention will be described clearly and completely in combination of the figures of the embodiments in the invention.

Please refer to FIGS. 1-6, one embodiment of the invention provides a magnetic transmission apparatus which includes a first rotating shaft 81, a second rotating shaft 82, a first rotating part 1, a second rotating part 2, a third rotating part 3 and a still part 4. The first rotating shaft 81, the second rotating shaft 82, the first rotating part 1, the second rotating part 2, and the third rotating part 3 are all rotatably arranged relative to the still part 4. The first rotating shaft 81 and the second rotating shaft 82 are arranged coaxially, and both distributed along an axial direction. It should be understood that in the embodiment, the terms "axial", "radial" and "circumferential" are all relative to the central axes of the first rotating shaft 81 and the second rotating shaft 82.

Figure 1:
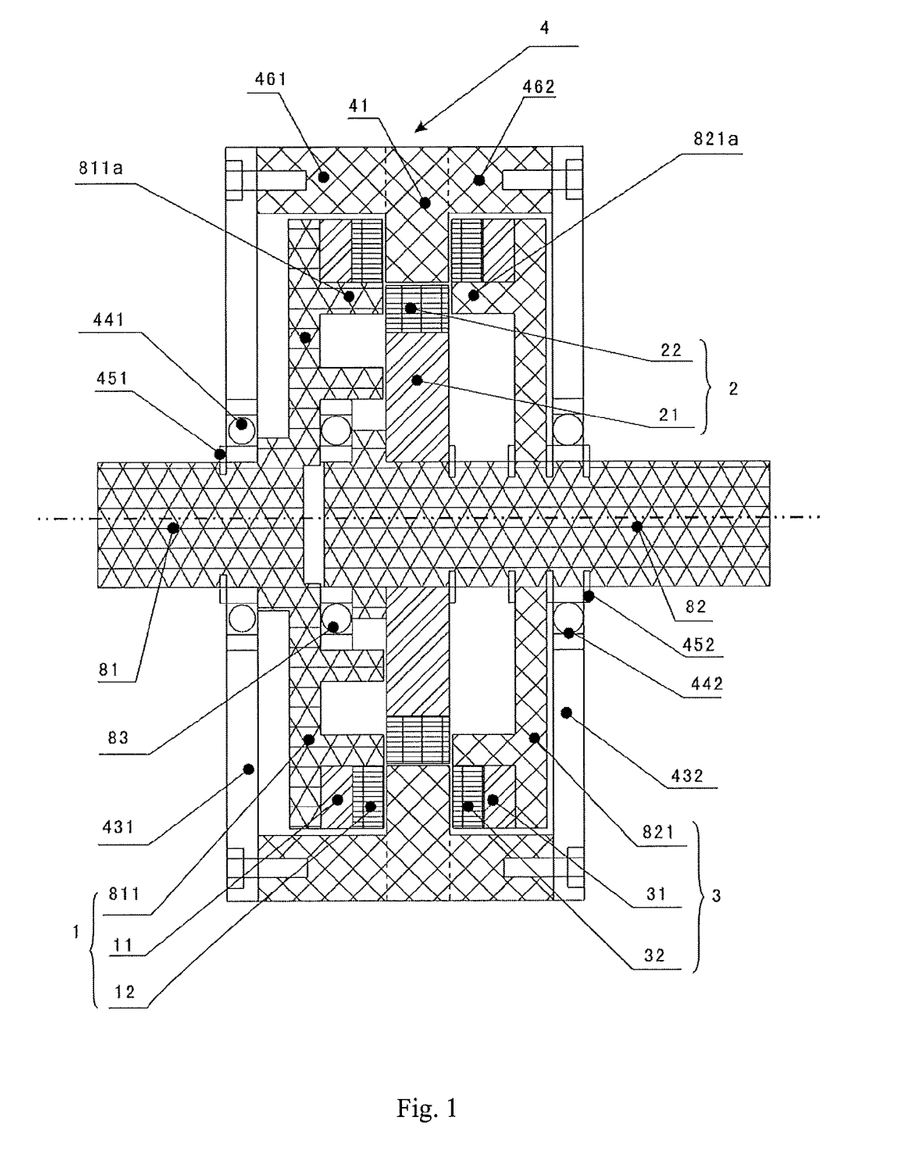
FIG. 1 is an axial sectional structural schematic view of a magnetic transmission apparatus according to a preferred embodiment of the invention.
Figure 2:
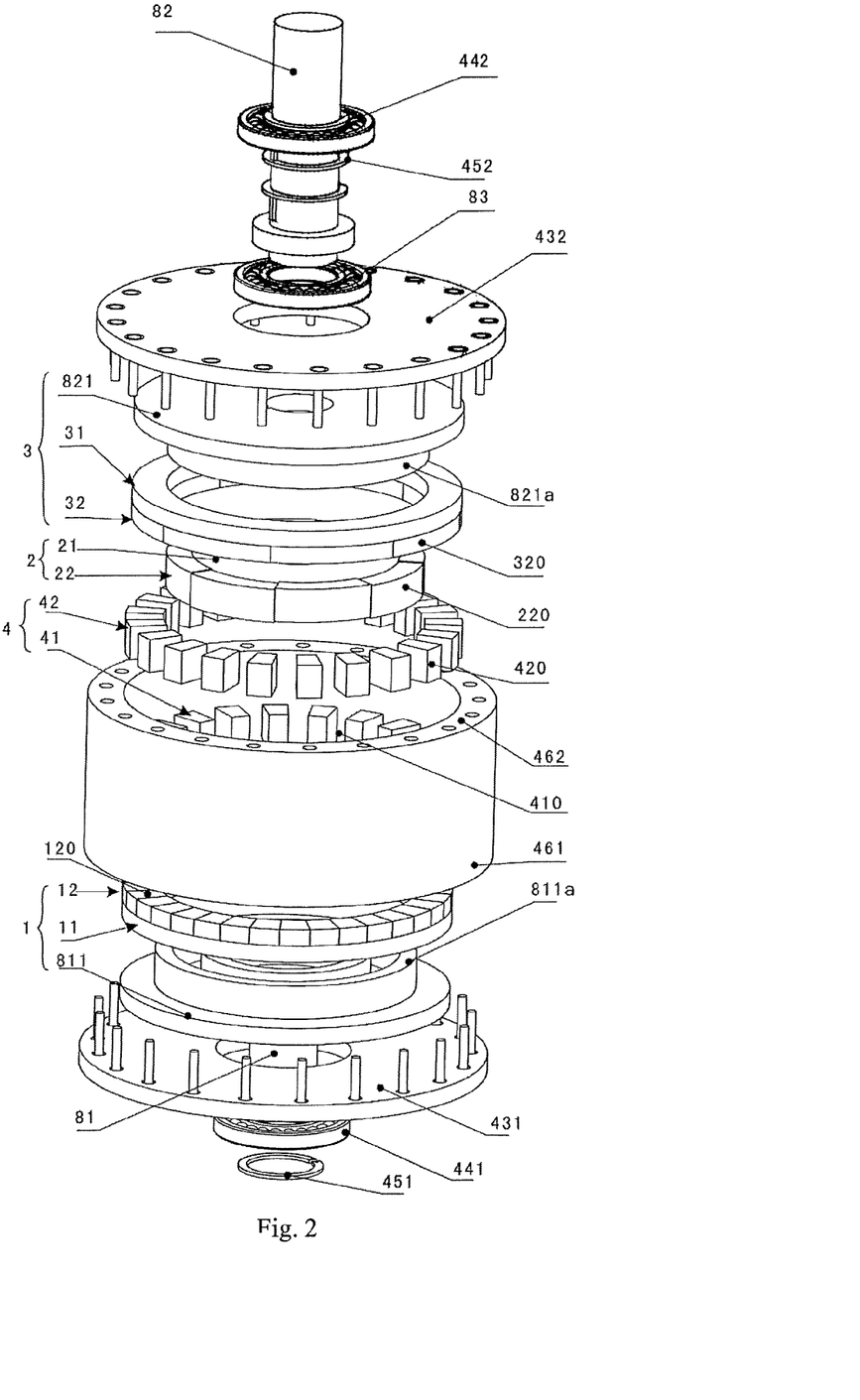
FIG. 2 is a 3D exploded view of the magnetic transmission apparatus in FIG. 1.

The first rotating part 1 is rigidly connected with the first rotating shaft 81 as a whole, and rotates together with the first rotating shaft 81 at the same speed. Both the second rotating part 2 and the third rotating part 3 are fixed to the second rotating shaft 82, and rotated together at the same speed. The first rotating part 1, the second rotating part 2 and the third rotating part 3 are arranged axially and successively. One of the first rotating shaft 81 and the second rotating shaft 82 is a driving shaft, and the other one is a driven shaft. For example, when the first rotating shaft 81 is a driving shaft, the second rotating shaft 82 is a driven shaft; rotating power is exerted on the first rotating shaft 81, and output through the second rotating shaft 82, and vice versa.

The specific structures of the first rotating part 1, the second rotating part 2, the third rotating part 3 and the still part 4 and other parts of the magnetic transmission apparatus provided by an embodiment of the invention are described in detail below.

As shown in FIGS. 1-2, the first rotating part 1 includes a first iron core 11, a first permanent magnet 12 and a first support part 811. The first support part 811 is rigidly connected with the first rotating shaft 81. Both the first iron core 11 and the first permanent magnet 12 are ring shaped and mounted on the first support part 811.

The second rotating part 2 includes a second iron core 21 and a second permanent magnet 22. Both the second iron core 21 and the second permanent magnet 22 are ring shaped; the second permanent magnet 22 is mounted on the second iron core 21, and the second iron core 21 is mounted on the second rotating shaft 82.

The third rotating part 3 includes a third iron core 31, a third permanent magnet 32 and a second support part 821. The second support part 821 is fixed on the second rotating shaft 82. Both the third iron core 31 and the third permanent magnet 32 are ring shaped and mounted on the second support part 821.

The second permanent magnet 22 is magnetized radially, which means that the N polar and S polar of the second permanent magnet 22 are distributed along a radial direction. The first permanent magnet 12 and the third permanent magnet 32 are magnetized axially, which means the N polar and S polar of the first permanent magnet 12 and the third permanent magnet 32 are distributed along the axial direction. Since the first permanent magnet 12 and the third permanent magnet 32 are magnetized axially, and the second permanent magnet 22 is magnetized radially, so that the magnetic transmission apparatus of the invention possesses a radially and axially mixed magnetic circuit; the magnetic field produced by the first permanent magnet 12, the second permanent magnet 22 and the third permanent magnet 32 is modulated by the magnetic regulation ring 42. More magnetic field harmonics in the axial air gap and radial air gap will contribute to the transmission of the torque, thereby taking full advantage of the finite geometric space.

The still part 4 mainly includes a magnetic regulation seat 41 and a magnetic regulation ring 42. The magnetic regulation ring 42 is ring shaped and fixed on the magnetic regulation seat 41. The second rotating part 2 and the magnetic regulation ring 42 are homocentric and coaxial. The first iron core 11, the first permanent magnet 12, the magnetic regulation ring 42, the third permanent magnet 32 and the third iron core 31 are coaxially arranged, and successively distributed along the axial direction. As shown in FIG. 1, the first permanent magnet 12 and the third permanent magnet 32 have identical inner diameters and identical outer diameter, which means that along the axial direction, the tori formed by the projections of the first permanent magnet 12 and the third permanent magnet 32 totally coincide. The magnetic regulation ring 42 is located in the very middle position between the first permanent magnet 12 and the third permanent magnet 32, and has the same inner diameter as the first permanent magnet 12. Since the magnetic regulation ring 42 is sleeved outside the second permanent magnet 22, the outer diameter of the second permanent magnet 22 is smaller than the inner diameter of the magnetic regulation ring 42, that is, smaller than the inner diameter of the third permanent magnet 32, thereby forming a stepladder structure between the first permanent magnet 12 and the third permanent magnet 32. Because of the orthogonality and specific position relation between the second permanent magnet 22 and the third permanent magnet 32, the magnetic field lines produced by the second permanent magnet 22 and the third permanent magnet 32 are driven to one side of the first rotating part 1, thereby improving the degree of coupling, and the torque density of magnetic transmission.

In the embodiment, as shown in FIGS. 1 and 2, preferably, the first support part 811 and the first rotating shaft 81 are formed integrally so as to improve the structural strength between the first support part 811 and the first rotating shaft 81. Both the first support part 811 and the first rotating shaft 81 are made of non-magnetic conductive material. The non-magnetic conductive material can be non-magnetic conductive material with high strength, such as aluminum alloy and stainless steel, thereby avoiding affecting the magnetic circuit inside the magnetic transmission apparatus. Furthermore, the first support part 811 and the second rotating shaft 81 can also be of independent structures, and fixedly connected through key joints or other ways. When the first support part 811 and the second rotating shaft 81 are of independent structures, the material used by the first support part 811 and the second rotating shaft 81 can be different.

Both the first iron core 11 and the first permanent 12 are mounted on the first support part 811. Specifically, the first iron core 11 is fixed on the first support part 811, the first permanent part 12 is fixed on the first iron core 11, and the first iron core 11 is located between the first permanent magnet 12 and the first support part 811, so as to make the first permanent magnet 12 be relatively close to the magnetic regulation ring 42.

Furthermore, the first support part 811 is disk shaped. A first ring-shaped projection 811a is protruded from the position close to the outer edge of the first support part 811, and is projected towards the direction of the third rotating part 3. The first iron core 11 and the first permanent magnet 12 are mounted on the first ring-shaped projection 811a, and the first iron core 11 is fixed between the first permanent 12 and the outer edge of the first support part 811. The first permanent magnet 12 is fixed to the first iron core 11 by sticking.

The second iron core 21 can be fixed on the second rotating shaft 82 by snap ring and key, and the second permanent magnet 22 can be adhered to the second iron core 21 by sticking. The second support part 821 can be fixed on the second rotating shaft 82 by snap rings and keys. The second rotating shaft 82 is made of non-magnetic conductive material. The second support part 821 is made of non-magnetic and non-electrical conductive material, and can prevent the magnetic field produced by the third permanent magnet 32 from forming a loop through the magnetic regulation ring 42, the second permanent magnet 22, the second iron core 21, the second rotating shaft 82 and the third rotating part 3, and drive the magnetic field lines produced by the second permanent magnet 22 and the third permanent magnet 32 to one side of the first rotating part 1, thereby improving the degree of coupling of the magnetic field, and the torque density of the magnetic transmission apparatus. Since the second support part is made of non-magnetic and non-electrical conductive material, the third rotating part 3, the second rotating shaft 82 and the second rotating part 2 can be avoided from the short circuit state in the circuit, so that eddy-current loss is decreased. Preferably, the second support part 821 is made of epoxy resin with high strength and good thermal conductivity performance. To be sure, in other embodiments, the second supporting part 821 can be made of nylon, plastic, phenolic resin, polyformaldehyde, ceramic and others.

Furthermore, the second support part 821 is disk shaped. A second ring-shaped projection 821a is protruded from the position close to the outer edge of the second support part 821, and is projected towards the direction of the first rotating part 1. The third iron core 31 and the third permanent magnet 32 are mounted outside the second ring-shaped projection 821a, and the third iron core 31 is fixed between the third permanent 32 and the outer edge of the second support part 821 so as to make the third permanent magnet 32 relatively close to the magnetic regulation ring 42. At the same time, the second support part 821 can facilitate assembly and connection of the third rotating part 3 with the second rotating shaft 82.

Figure 3:
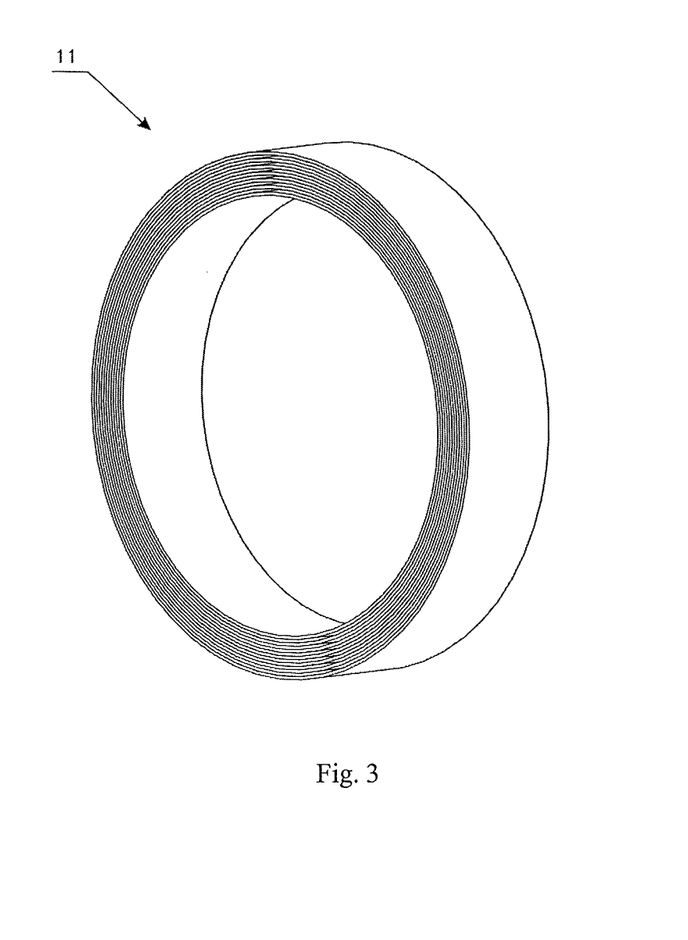
FIG. 3 is a schematic view of the laminated way of the silicon steel sheets of the first iron core of the magnetic transmission apparatus in FIG. 2.

The first iron core 11 and the third iron core 31 are respectively formed by wound silicon steel sheet. The specific structure of the first iron core 11 is as shown in FIG. 3. In the embodiment, the structure of the third iron core 31 is the same as that of the first iron core as shown in FIG. 3. The second iron core 21 laminated axially with silicon steel sheet so as to decrease eddy-current loss.

The relation among the first permanent magnet 12, the second permanent magnet 22, the third permanent magnet 32 and the magnetic regulation ring 42 will be described in detail below.

As shown in FIG. 2, the first permanent magnet 12 includes $2N_1$ first permanent magnetic blocks 120. The $2N_1$ first permanent magnetic blocks 120 are distributed into a ring shape along a circumference, and the magnetic poles of the $2N_1$ first permanent magnetic blocks 120 are magnetized alternately and axially so as to form $N_1$ pairs of permanent magnetic poles. The third permanent magnet 32 includes $2N_2$ third permanent magnetic blocks 320. The $2N_2$ third permanent magnetic blocks 320 are distributed into a ring shape along a circumference, and the magnetic poles of the $2N_2$ third permanent magnetic blocks 320 are magnetized alternately and axially so as to form $N_2$ pairs of permanent magnetic poles. The second permanent magnet 22 includes $2N_2$ second permanent magnetic blocks 220. The $2N_2$ second permanent magnetic blocks 220 are distributed into a ring shape along a circumference, and the magnetic poles of the $2N_2$ second permanent magnetic blocks 220 are magnetized alternately and axially so as to form $N_2$ pairs of permanent magnetic poles; that is, the number of the third permanent magnets 320 is equal to the number of the second permanent magnets 220. Preferably, the first permanent magnet 12, the second permanent magnet 22 and the third permanent magnet 32 are all made of high-performance Nd—Fe—B material.

Figure 4:
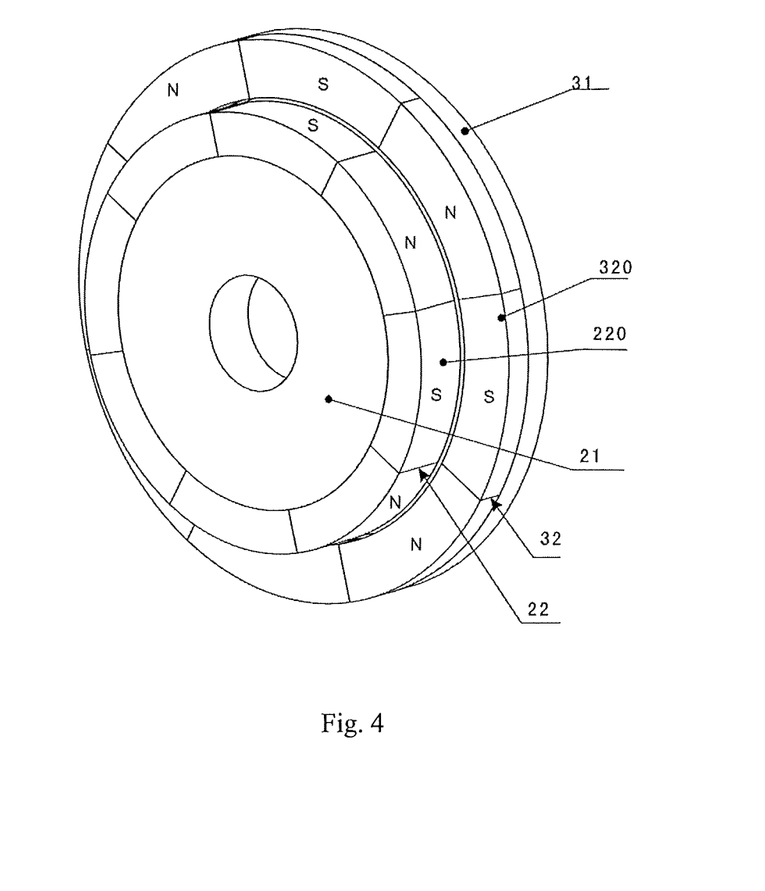
FIG. 4 is a schematic view of the relative positional relation between the second rotating part and the third rotating part of the magnetic transmission apparatus in FIG. 1.
Figure 5:
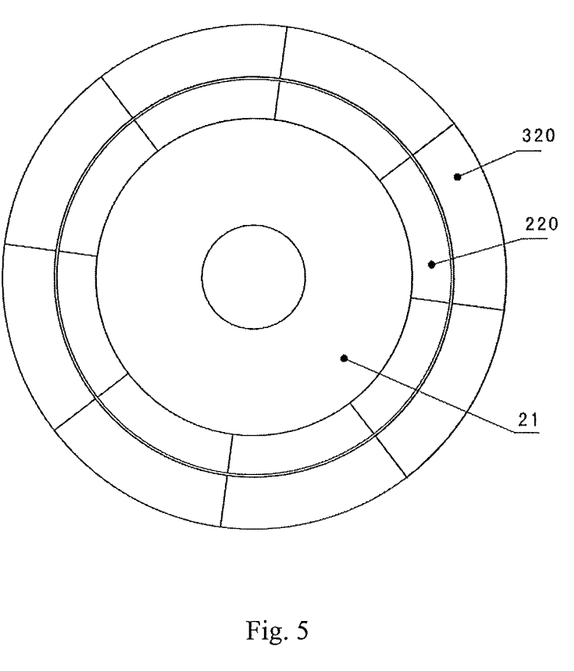
FIG. 5 is a schematic view of the relative positional relation between the axial orthographic projections of the second rotating part and the third rotating part of the magnetic transmission apparatus in FIG. 4.

As shown in FIGS. 4-5, the third permanent magnetic blocks 320 are one-to-one correspondent with the second permanent magnetic blocks 220, which means that the axially projected sector area formed by each of the permanent magnetic blocks of the second permanent magnet 22 right corresponds with the axially projected sector area formed by each of the permanent magnetic blocks of the third permanent magnet 32 in the radial direction. The one-to-one correspondent third permanent magnetic blocks 320 and second permanent magnetic blocks 220 are assembled into a stepladder shape, and the adjacent magnetic pole therebetween is identical. As shown in FIGS. 4 and 5, "adjacent magnetic pole therebetween" means that: the magnetic pole of a third permanent magnetic block 320, which is close to one end of the magnetic regulation ring 42, is adjacent to the outer end of a second permanent block 220 which is opposite to the third permanent magnetic block 320. For example, when the magnetic pole of a third magnetic permanent block 320, which is close to the one end of the magnetic regulation ring 42, is N polar, the magnetic pole of the outer end of a second permanent block 220 which is opposite to the third permanent magnetic block 320 is also N polar; if the magnetic pole of a third magnetic permanent block 320, which is close to the one end of the magnetic regulation ring 42, is S polar, the magnetic pole of the outer end of a second permanent block 220 which is opposite to the third permanent magnetic block 320 is also S polar. The one-to-one correspondent third permanent magnetic blocks 320 and second permanent magnetic blocks 220 are assembled into a stepladder shape; the structure and magnetic pole arrangement can force the magnetic field lines produced by the second permanent magnet 22 and the third permanent magnet 32 to one side of the first rotating part 11, thereby further improving the degree of coupling of the magnet field and the torque density of the magnetic transmission apparatus.

Figure 6:
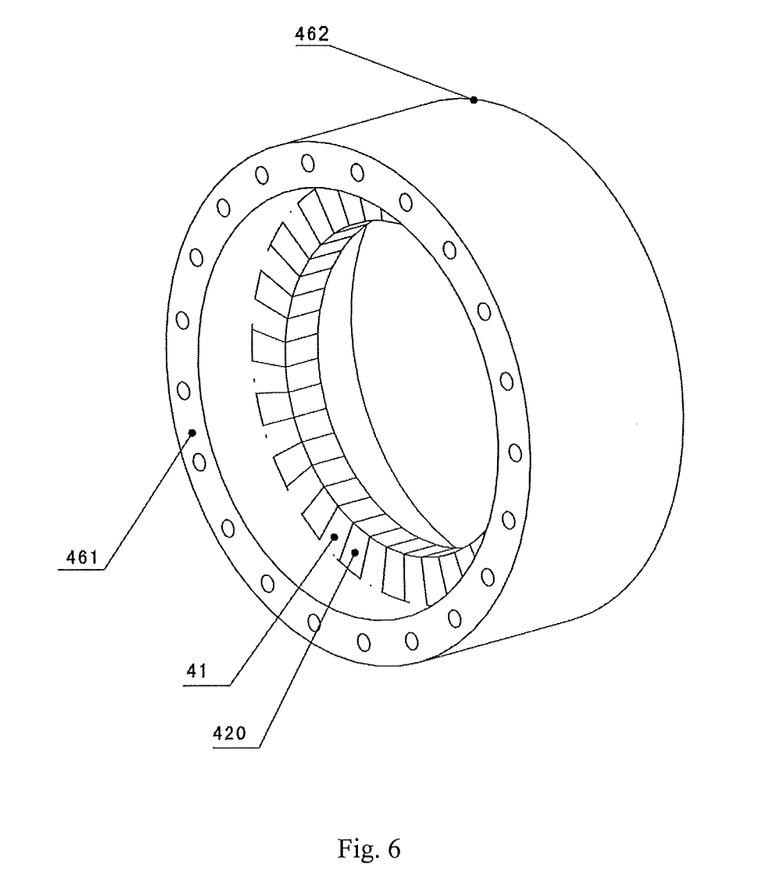
FIG. 6 is a 3D structural schematic view of the still part of the magnetic transmission apparatus in FIG. 2.

As shown in FIGS. 2 and 6, the magnetic regulation ring 42 includes $N_3$ magnetic regulation blocks 420. The $N_3$ magnetic regulation blocks 420 are evenly distributed along a circumference. $N_3=N_1+N_2$, wherein $N_1$ and $N_2$ are positive integrals. The magnetic transmission apparatus disclosed by the invention is realized by the magnetic field modulation principle; the modulated space magnetic field harmonics require stable energy transfer, and the number of pole pairs and rotating speed of the magnetic field harmonics should be identical. Therefore, the condition: $N_3=N_1+N_2$, needs to be met, wherein $N_1$ and $N_2$ are positive integrals. The first rotating part rotates at the speed of $\omega_1$; the second rotating part and the third rotating part rotate at the same speed, $\omega_2$, with the second rotating shaft, wherein $$\omega_1 = -\frac{N2}{N1}\omega_2,$$

and the negative sign signifies that the rotating directions are opposite. If $N_1>N_2$, then the first rotating part 1 where the first permanent magnet 12 is located and the first rotating shaft 81 are the low-speed side; the second rotating part 2, the third rotating part 3 and the second rotating shaft 82 are the high-speed side. If $N_1<N_2$, then first rotating part 1 where the first permanent magnet 12 is located and the first rotating shaft 81 are the high-speed side; the second rotating part 2, the third rotating part 3 and the second rotating shaft 82 are the low-speed side. In other words, the whole connected by the second rotating part 2, the third rotating part 3 and the second rotating shaft 82 can be the low-speed side or the high-speed side. For one of ordinary skill in the art, the numbers of $N_1$, $N_2$ and $N_3$ can be adjusted according to the structure of the invention so as to achieve different speed changes, and a magnetic transmission apparatus designed concerning aforementioned adjustment is deemed to be contained in the protection scope of the invention.

In the embodiment, as shown in FIG. 6, the magnetic regulation seat 41 is disk shaped. A plurality of magnetic regulation grooves 410 are provided on the inner side of the magnetic regulation seat 41 and evenly distributed along a circumference. The magnetic regulation blocks 420 are fixed on and one-to-one correspondent with the magnetic regulation grooves 410. The magnetic regulation blocks 420 can be kept from moving circumferentially or radially using the magnetic regulation grooves 410. Furthermore, the still part 4 further include a first housing 461 and a second housing 462, both of which are tube shaped and coaxial with the magnetic regulation seat. The magnetic regulation grooves 41 are arranged between the first housing 461 and the second housing 462. In the embodiment, the first housing 461, the second housing 462 and the magnetic regulation seat 41 are formed integrally, which means that the first housing 461, the second housing 462 and the magnetic regulation seat 41 are fabricated into one part so as to decrease the parts, which is easy to process and manufacture and convenient to assemble. The first rotating part 1 is arranged inside the first housing 461, and the second rotating part 2 is arranged inside the second housing 462, thereby using the first housing 461 and the second housing 462 to form the housing of the whole magnetic transmission apparatus.

Preferably, the magnetic regulation blocks 420 are compressedly moulded using soft magnetic powder in the magnetic regulation grooves 410 so as to make the magnetic regulation blocks 420 to be integrally designed with the magnetic regulation seat 41 during processing, thereby facilitating processing and manufacturing. The whole integrally moulded by the first housing 461, the second housing 462 and the magnetic regulation seat 41 is made of non-magnetic non-electrical conductive material, specifically, nylon, plastic, epoxy resinphenolic resin, polyformaldehyde, ceramic and others. Preferably, the material is epoxy resin with high strength and good thermal conductive performance.

Furthermore, as shown in FIGS. 1 and 2, the still part 4 further includes a first end cap 431 and a second end cap 432; the first end cap 431 and the second end cap 432 are respectively fixed at the ends of the first housing 461 and the second housing 462 with bolt or others. The first rotating shaft 81 penetrates the first end cap 431, and a bearing 441 and a snap ring 451 are arranged therebetween so as to facilitate assembling the first rotating shaft 81 and the first end cap 431 and ensure the stability of the rotation of the first rotating shaft 81. The second rotating shaft 82 penetrates the second end cap 432, and a bearing 442 and a snap ring 452 are arranged therebetween, so as to facilitate assembling the second rotating shaft 82 and the second end cap 432 and ensure the stability of the rotation of the second rotating shaft 82.

A bearing 83 is arranged between the ends of the first rotating shaft 81 and the second rotating shaft 82 which are close to each other, so as to facilitate corresponding assembly between the first rotating shaft 81 and the second rotating shaft 82 and ensure the stability of the rotation of the first rotating shaft 81 and the second rotating shaft 82.

The magnetic transmission apparatus of the invention possesses an axially and radially mixed magnetic circuit; the magnetic field produced by the first permanent magnet 12, the second permanent magnet 22 and the third permanent magnet 32 is modulated by the magnetic regulation ring 42. More magnetic field harmonics in the axial air gap and radial air gap will contribute to the transmission of the torque, thereby taking full advantage of the finite geometric space. The magnetizing methods and corresponding position relation of the second permanent magnet 22 and the third permanent magnet 32 force the magnetic field lines produced by the second permanent magnet 22 and the third permanent magnet 32 to one side of the first rotating part 1, thereby improving the degree of coupling of the magnetic field, and the torque density of magnetic gear. The second support part 821 adopts non-magnetic and non-electrical conductive material, which can not only prevent the magnetic field produced by the third permanent magnet 32 from forming a magnetic loop through the third iron core 31, magnetic regulation ring 41, the second permanent magnet 22, the second iron core 21, and the second rotating shaft 82, but also force the magnetic field lines produced by the second permanent magnet 22 and the third permanent magnet 32 to one side of the first rotating part 1; the third rotating part 3, the second rotating shaft 82 and the second rotating part 2 can be avoided from the short circuit state in the circuit, thereby decreasing eddy-current loss.

As shown in FIGS. 7-10, another embodiment of the magnetic transmission apparatus is provided by the present application.

Figure 7:
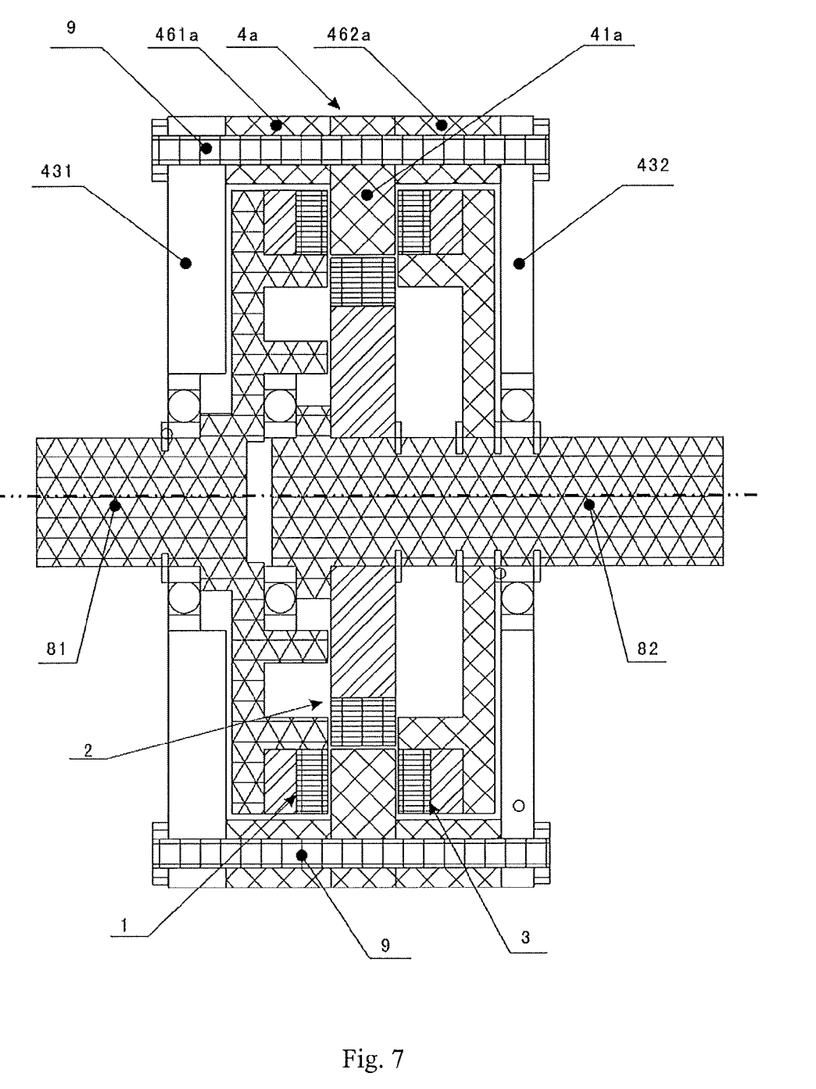
FIG. 7 is an axial sectional structural schematic view of the magnetic transmission apparatus provided by another embodiment of the invention.
Figure 8:
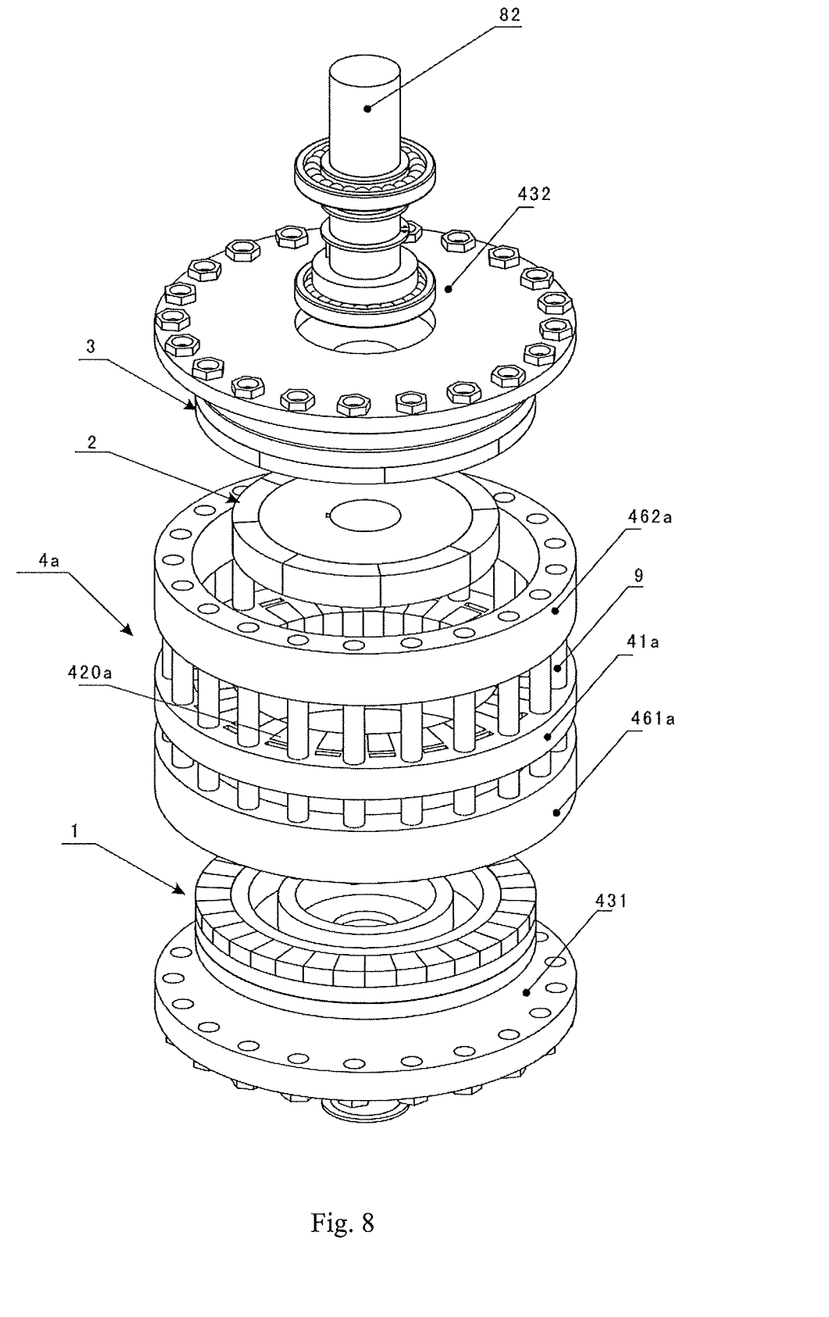
FIG. 8 is a 3D exploded view of the magnetic transmission apparatus in FIG. 7.

The magnetic regulation seat 41a of the still part 4a, the first housing 461a and the second 462a are of independent structures, and fixedly connected together by bolts 9. The first end cap 431 is fixed at one end of the first housing 461a remote from the magnetic regulation seat 41a; the second end cap 432 is fixed at the other end of the second housing 462a remote form the magnetic regulation seat 41a. In the embodiment, the bolts 9 penetrate the first end cap 431, the first housing 461a, the magnetic regulation seat 41a, the second housing 462a and the second end cap 432 successively, and connect each of the parts of the still part 4 together so as to facilitate assembly and connection. There can be more or less bolts 9 which are distributed evenly along the circumference.

The magnetic regulation seat 41a, the first housing 461a and the second housing 462a are made of the same non-magnetic non-electrical conductive material, specifically, nylon, plastic, epoxy resin, phenolic resin, polyformaldehyde, ceramic and others. Preferably, the material is epoxy resin with high strength and good thermal conductive performance.

Figure 9:
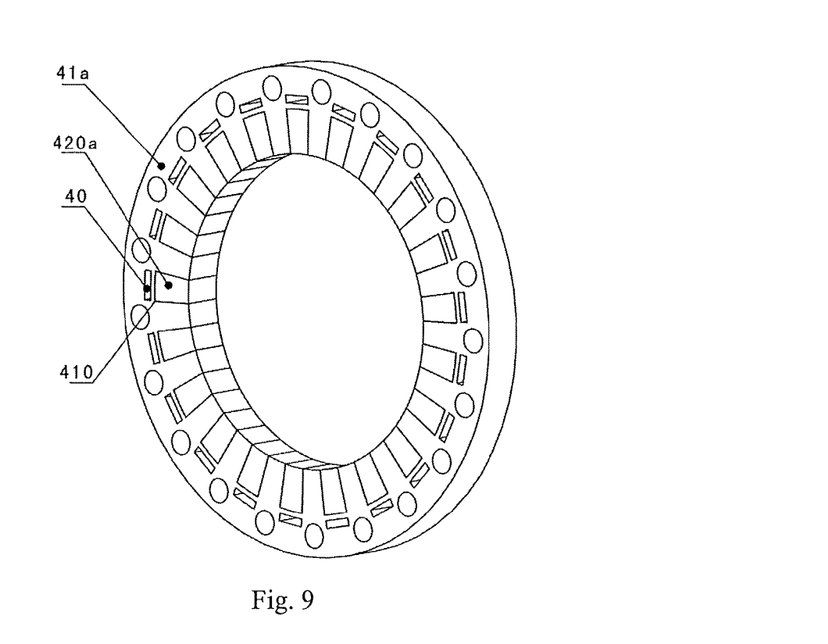
FIG. 9 is a schematic view of the magnetic regulation seat and the magnetic regulation ring of the magnetic transmission apparatus in FIG. 7.

Furthermore, a plurality of through-holes 40 are arranged on the magnetic regulation seat 41a which are one-to-one correspondent with the magnetic regulation grooves 410. The through-holes 40 are arranged along an axial direction, and located between the magnetic regulation grooves 410 and the outer side of the magnetic regulation seat 41a. The still part 4a further includes a plurality of ribands (not shown), which are one-to-one correspondent with the through-holes. The ribands pass through the through-holes 40 and the inner surface of the magnetic regulation seat 41a to form a ring-shape, and wrap the magnetic regulation blocks 420a, so as to fix the magnetic regulation blocks 420a on the magnetic regulation seat 41a firmly.

Figure 10:
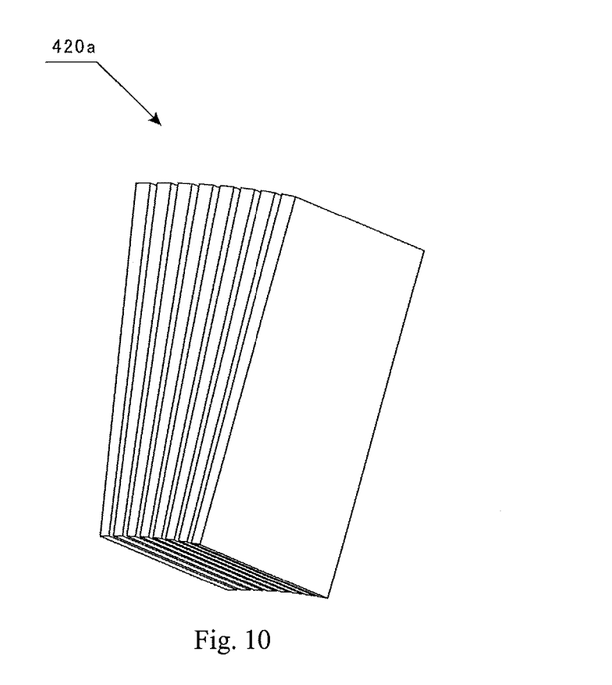
FIG. 10 is a schematic view of stacking mode of the magnetic regulation block in the magnetic regulation ring in FIG. 9.

Preferably, as shown in FIG. 10, the magnetic regulation blocks 420a are laminated circumferentially with silicon steel sheets. Since the magnetic regulation ring needs to modulate not only the radial magnetic field but also the axial magnetic field, the magnetic regulation blocks 420a being laminated circumferentially with the silicon steel sheets can decrease eddy-current loss raised by the change of the two magnetic fields.

This embodiment differs from the previous embodiment only in the structure of the still part, and the remaining parts are identical with the previous embodiment and do not need be described in unnecessary detail. Furthermore, in other embodiments, the magnetic regulation seat 41a can be formed integrally with the first housing 461a as a whole part and connected fixedly with the second housing 462a through bolts; alternatively, the magnetic regulation seat 41a can be formed integrally with the second housing 462a as a whole part and connected fixedly with the first housing 461a through a bolt.

The above contents are just preferred embodiments of the invention. It should be noted that for people skilled in the art, the invention can be improved and modified without going beyond the spirit of the invention, and the improvements and modifications should be deem as contained within the protection scope of the invention.

What is claimed is:

1. A magnetic transmission apparatus, wherein the magnetic transmission apparatus includes a first rotating shaft, a second rotating shaft, a first rotating part, a second rotating part, a third rotating part, and a still part;

the first rotating shaft, the second rotating shaft, the first rotating part, the second rotating part, and the third rotating part are all rotatably arranged relative to the still part; the first rotating shaft and the second rotating shaft are arranged coaxially, and both distributed along an axial direction; the first rotating part is rigidly connected with the first rotating shaft as a whole; the second rotating part, the third rotating part and the second rotating shaft are fixedly connected together as a whole; the first rotating part, the second rotating part, and the third rotating part are successively distributed along an axial direction;

the first rotating part includes a first iron core, a first permanent magnet and a first support part; both the first iron core and the first permanent magnet are ring shaped; both the first iron core and the first permanent magnet are mounted on the first support part; the first support part and the first rotating shaft are rigidly connected;

the second rotating part includes a second iron core and a second permanent magnet; the second rotating part is fixed on the second rotating shaft; both the second iron core and the second permanent magnet are ring shaped; the second permanent magnet is mounted on the second iron core concentrically and coaxially;

the third rotating part includes a third iron core, a third permanent magnet and a second support part; the second support part is fixed on the second rotating shaft; both the third iron core and the third permanent magnet are ring shaped, and both mounted on the second support part;

the still part mainly includes a magnetic regulation seat and a magnetic regulation ring; the magnetic regulation seat is made of non-magnetic non-electrical conductive material; the magnetic regulation ring is ring shaped and is fixed on the magnetic regulation seat; the second rotating part is located inside the magnetic regulation ring; the second rotating part and the magnetic regulation ring are homocentric and coaxial; the first iron core, the first permanent magnet, the magnetic regulation ring, the third permanent magnet and the third iron core are coaxially arranged, and successively distributed along an axial direction; the first permanent magnet and the third permanent magnet are magnetized axially; the second permanent magnet is magnetized radially.

2. The magnetic transmission apparatus of claim 1, wherein the first support part, the first rotating shaft, and the second rotating shaft are all made of non-magnetic conductive material; the second support part is made of non-magnetic non-electrical conductive material.

3. The magnetic transmission apparatus of claim 1, wherein the first permanent magnet includes $2N_1$ first permanent magnetic blocks; the $2N_1$ first permanent magnetic blocks are distributed into a ring shape along a circumference; the $2N_1$ first permanent magnetic blocks are magnetized axially alternately so as to form $N_1$ pairs of permanent magnetic pole; the third permanent magnet includes $2N_2$ third permanent magnetic blocks; the $2N_2$ third permanent magnetic blocks are distributed into a ring shape along a circumference; the magnetic poles of the $2N_2$ third permanent magnetic blocks are magnetized alternately so as to form $N_2$ pairs of permanent magnetic pole axially; the second permanent magnet includes $2N_2$ second permanent magnetic blocks; the $2N_2$ second permanent magnetic blocks are distributed into a ring shape along a circumference; the $2N_2$ second permanent magnetic blocks are magnetized radially alternately so as to form $N_2$ pairs of permanent magnetic pole; the magnetic regulation ring includes $N_3$ magnetic regulation blocks; the $N_3$ magnetic regulation blocks are evenly distributed at regular intervals along a circumference; $N_3=N_1+N_2$, wherein $N_1$ and $N_2$ are positive integrals, and $N1 \neq N2$.

4. The magnetic transmission apparatus of claim 3, wherein the first rotating part rotates at the speed of $\omega_1$; the second rotating part and the third rotating part rotate at the same speed, $\omega_2$, with the second rotating shaft, wherein $\omega_1 = -N_1/N_2 \omega_2$, and negative sign signifies that the rotating directions are opposite.

5. The magnetic transmission apparatus of claim 3, wherein the third permanent magnetic blocks are one-to-one correspondent with the second permanent magnetic blocks; the one-to-one correspondent third permanent magnetic blocks and second permanent magnetic blocks are assembled into stepladder shape, and the adjacent magnetic pole therebetween is identical.

6. The magnetic transmission apparatus of claim 1, wherein the first permanent magnet and the third permanent magnet have identical inner diameters and identical outer diameters; the magnetic regulation ring is located a middle position between the first permanent magnet and the third permanent magnet, and has identical inner diameter with the first permanent magnet.

7. The magnetic transmission apparatus of claim 1, wherein the still part further includes a first housing with a tube shape and a second housing with a tube shape; a plurality of magnetic regulation grooves are provided on an inner side of the magnetic regulation seat; the magnetic regulation grooves are evenly distributed along a circumference; magnetic regulation blocks of the magnetic regulation ring are fixed on the magnetic regulation grooves; the first housing and the second housing are coaxial with the magnetic regulation seat; the magnetic regulation seat is arranged between the first housing and the second housing; the first rotating part is arranged inside the first housing, and the second rotating part is arranged inside the second housing.

8. The magnetic transmission apparatus of claim 7, wherein the first housing, the second housing, and the magnetic regulation seat are formed integrally; or
the first housing, the second housing, and the magnetic regulation seat are of independent structures, and fixedly connected by a bolt.

9. The magnetic transmission apparatus of claim 7, wherein the magnetic regulation blocks are compression moulded using soft magnetic powder in the magnetic regulation grooves; or
the magnetic regulation blocks are laminated along the circumference with silicon steel sheet.

10. The magnetic transmission apparatus of claim 7, wherein a plurality of through-holes are arranged on the magnetic regulation seat which are one-to-one correspondent with the magnetic regulation grooves; the through-holes are arranged along an axial direction, and located between the magnetic regulation grooves and an outer side of the magnetic regulation seat; the still part further includes a plurality of ribands which are one-to-one correspondent with the through-holes; the ribands pass through the through-holes and an inner surface of the magnetic regulation seat to form a ring shape, and wrap the magnetic regulation blocks.

* * * * *